(12) United States Patent
Dumenil et al.

(10) Patent No.: US 11,486,235 B2
(45) Date of Patent: Nov. 1, 2022

(54) TOOLS FOR SELECTING AND SEQUENCING OPERATING PARAMETER CHANGES TO CONTROL A HYDROCARBON PRODUCTION SYSTEM

(71) Applicants: BP CORPORATION NORTH AMERICA INC., Houston, TX (US); BP EXPLORATION OPERATING COMPANY LIMITED, Middlesex (GB)

(72) Inventors: Jean-Charles Dumenil, Little Chalfont (GB); Richard Heddle, Camberley (GB); Shaojun Wang, Katy, TX (US)

(73) Assignees: BP CORPORATION NORTH AMERICA INC., Houston, TX (US); BP EXPLORATION OPERATING COMPANY LIMITED, Middlesex (GB)

(*) Notice: Subject to any disclaimer, the term of this patent is extended or adjusted under 35 U.S.C. 154(b) by 503 days.

(21) Appl. No.: 16/610,153

(22) PCT Filed: May 16, 2018

(86) PCT No.: PCT/EP2018/062714
§ 371 (c)(1),
(2) Date: Nov. 1, 2019

(87) PCT Pub. No.: WO2018/210925
PCT Pub. Date: Nov. 22, 2018

(65) Prior Publication Data
US 2021/0198984 A1    Jul. 1, 2021

Related U.S. Application Data

(60) Provisional application No. 62/506,844, filed on May 16, 2017.

(51) Int. Cl.
*E21B 41/00* (2006.01)
*E21B 43/12* (2006.01)
(Continued)

(52) U.S. Cl.
CPC .............. *E21B 43/12* (2013.01); *E21B 41/00* (2013.01); *G05B 19/04* (2013.01); *G06G 7/48* (2013.01); *G05B 2219/45208* (2013.01)

(58) Field of Classification Search
CPC .......... E21B 43/12; E21B 41/00; E21B 43/00; E21B 43/2401; G05B 19/04;
(Continued)

(56) References Cited

U.S. PATENT DOCUMENTS 10,858,931 B2 * 12/2020 Chen ....................... E21B 47/12
2005/0267718 A1   12/2005 Guyaguler et al.
(Continued)

FOREIGN PATENT DOCUMENTS

CN     101221634 A  *  7/2008  ............. E21B 43/00
CN     102421988 A  *  4/2012  ......... E21B 43/2401
(Continued)

OTHER PUBLICATIONS

PCT/EP2018/062714 International Search Report and Written Opinion dated Aug. 30, 2018 (501100) (9 p.).

*Primary Examiner* — Kandasamy Thangavelu
(74) *Attorney, Agent, or Firm* — Conley Rose, P.C.

(57) ABSTRACT

A process for use in managing a hydrocarbon production system includes: selecting, from among a plurality of changes proposed to operating parameters of the hydrocarbon production system, the proposed change with the greatest estimated positive change in production; assessing whether the selected change violates an operating constraint; based on said assessment, producing a valid change based on at least the selected change or identifying the selected (Continued)

change as an unusable change, iterating the above steps, the iteration excluding the valid change from the plurality of proposed changes; and implementing at least one valid change, the number of implemented valid changes being less than the number of proposed changes.

20 Claims, 5 Drawing Sheets

(51) Int. Cl.
  *G05B 19/04* (2006.01)
  *G06G 7/48* (2006.01)
(58) Field of Classification Search
  CPC ........ G05B 2219/45208; G05B 13/042; G06G 7/48; G01V 11/00; G06F 30/20; G06Q 10/06375
  See application file for complete search history.

(56) References Cited

U.S. PATENT DOCUMENTS

| | | | |
|---|---|---|---|
| 2006/0184329 A1* | 8/2006 | Rowan | G01V 11/00 702/50 |
| 2010/0036537 A1* | 2/2010 | Bieker | G05B 13/042 700/285 |
| 2011/0087476 A1 | 4/2011 | Calvert et al. | |

FOREIGN PATENT DOCUMENTS

| | | | | |
|---|---|---|---|---|
| CN | 102473232 A | * | 5/2012 | ....... G06Q 10/06375 |
| EP | 2161406 A1 | * | 3/2010 | ............. E21B 43/00 |
| FR | 3037682 A1 | * | 12/2016 | ............. G06F 30/20 |
| WO | 2004/046503 A1 | | 6/2004 | |
| WO | WO 2004046503 A1 | * | 6/2004 | ............. E21B 41/00 |
| WO | WO 2006066166 A2 | * | 6/2006 | ............. G01V 11/00 |
| WO | 2006/111820 A2 | | 10/2006 | |
| WO | 2013/066358 A2 | | 5/2013 | |

* cited by examiner

TOOLS FOR SELECTING AND SEQUENCING OPERATING PARAMETER CHANGES TO CONTROL A HYDROCARBON PRODUCTION SYSTEM

CROSS-REFERENCE TO RELATED APPLICATIONS

This application is a 35 U.S.C. § 371 national stage application of PCT/EP2018/062714 filed May 16, 2018, entitled "Tools for Selecting and Sequencing Operating Parameter Changes to Control a Hydrocarbon Production System," which claims priority to U.S. Provisional Application No. 62/506,844 filed May 16, 2017, and entitled "Tools for Selecting and Sequencing Operating Parameter Changes to Control a Hydrocarbon Production System," each of which is hereby incorporated herein by reference in its entirety for all purposes.

STATEMENT REGARDING FEDERALLY SPONSORED RESEARCH OR DEVELOPMENT

Not applicable.

BACKGROUND

Field of the Invention

The present disclosure pertains to tools and techniques for use in managing a hydrocarbon producing field, and more particularly to a hydrocarbon production system for such a field.

Background of the Invention

Hydrocarbons such as crude oil and natural gas are frequently found in large underground deposits. If conditions are suitable, the field is brought into production by drilling wells and then extracting the hydrocarbons. Such a field will usually include a substantial number of wells, each producing at its own pace and contributing to the overall production of the field.

The management of such a field is a difficult and complicated endeavor. It is generally desirable to maximize production by managing the operation of the wells.

Achieving this goal is complicated by the fact that each well operates under a distinct set of conditions that frequently differ substantially from other wells in the field. The operation and production of a well may also influence the production of one or more other wells in the field. Even within the context of a single well, some of these conditions are interrelated in non-intuitive ways.

Field management is therefore commonly entrusted to a production management system. Individual wells are instrumented to measure operating conditions and these operating conditions are monitored for a variety of reasons. Data obtained apart from the wells is also sometimes used. For example, the cumulative production of the field may be monitored apart from the wells.

It is occasionally desirable to review the operation of a well to see if its production can be increased. This is usually done by a well operator through a production management system. The production management system provides information the well operator may use to change the operating conditions by changing the operating parameters of the well.

Current industry practice is that the well operator is provided with a list of operating parameters to change. The well operator picks a few operating parameters to change from this list, based on their experience, and this may not lead to the maximum benefit. Also after picking up the control operating parameters they wish to change, the well operator may not know in which sequence to make the changes. Without correct change sequence, some changes may undesirably violate some operating constraints. Current practice therefore does not yield the best operating parameters to change or any indication that the changes do not violate constraints.

Furthermore, in practice, well operators are reluctant to change too many variables at once. Typically, when presented with a long list of changes to be made to a system, the well operator will use their judgment to choose a few of the changes. Whilst the well operator may be advised how much production increase could be expected upon making all the changes, they are not informed how much increase could be expected as a result of making each individual change. Accordingly, it is not possible for the well operator to know with certainty which changes would result in the greatest production increase.

BRIEF SUMMARY OF THE DISCLOSURE

In an embodiment, a process for use in managing a hydrocarbon producing system, comprises: selecting, from among a plurality of changes proposed to operating parameters of the hydrocarbon producing system, the proposed change with the greatest estimated positive change in production; assessing whether the selected change violates a set of operating constraints; based on said assessment, producing a valid change based on at least the selected change or identifying the selected change as an unusable change, iterating the above steps, the iteration excluding the valid change from the plurality of proposed changes; and implementing at least one valid change, the number of implemented valid changes being less than the number of proposed changes.

In another embodiment, a production management system for managing a hydrocarbon producing system, the production management system comprising: a plurality of instruments distributed across the hydrocarbon producing system, each instrument monitoring an operating parameter of the hydrocarbon producing system and at least some of the instruments also controlling the respective monitored operating parameter; a computing apparatus; and a software tool residing on the computing apparatus that, when executed by the computing apparatus, performs a method comprising: selecting, from among a plurality of changes proposed to operating parameters of the hydrocarbon producing system, the proposed change with the greatest estimated positive change in production; assessing whether the selected change violates a set of operating constraints; based on said assessment, producing a valid change based on at least the selected change or identifying the selected change as an unusable change, iterating the above steps, the iteration excluding the valid change from the plurality of proposed changes; and implementing at least one valid change, the number of implemented valid changes being less than the number of proposed changes.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

The presently disclosed technique is directed to ascertaining and implementing changes to operating parameters in a producing field to achieve a previously defined optimization point—or "optimized" operating point—for such operations. The optimization point defines a desired operating point for the field which, in turn, is defined by a large number of operating parameters for the wells and other equipment involved in the production from the field. The optimization point therefore comprises a set of operating parameters that will "optimize" production from the field.

Some of these operating parameters are directly controlled by the production management system for the field. In some contexts, these controlled operating parameters may be called "control variables" or "control operating parameters". Other operating parameters are not directly controlled by the production management system.

These operating parameters are typically a function of the controlled operating parameters, or some combination of them. Typically the optimization generates a set of parameters, and all of those parameters are control variables, and they can be changed either automatically or manually.

Sometimes the relationship amongst the controlled operating parameters and the uncontrolled operating parameters is not evident. Sometimes it is counter-intuitive, so that changing one operating parameter yields an unanticipated, or unintended, change in another. Furthermore, the order in which changes are implemented might impact the end result differently. The number of operating parameter changes to achieve the optimized operating point may also be quite large, particularly in larger fields.

Accordingly, the presently disclosed technique identifies the controlled operating parameter changes that will move the operating state of the field from the current operating point to an optimized operating point. It furthermore defines a sequence for those changes. In some embodiments, it will also help an operator identify and implement a subset of such changes that will most quickly and easily achieve the increase in production represented by the optimization point.

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

Figure 1:
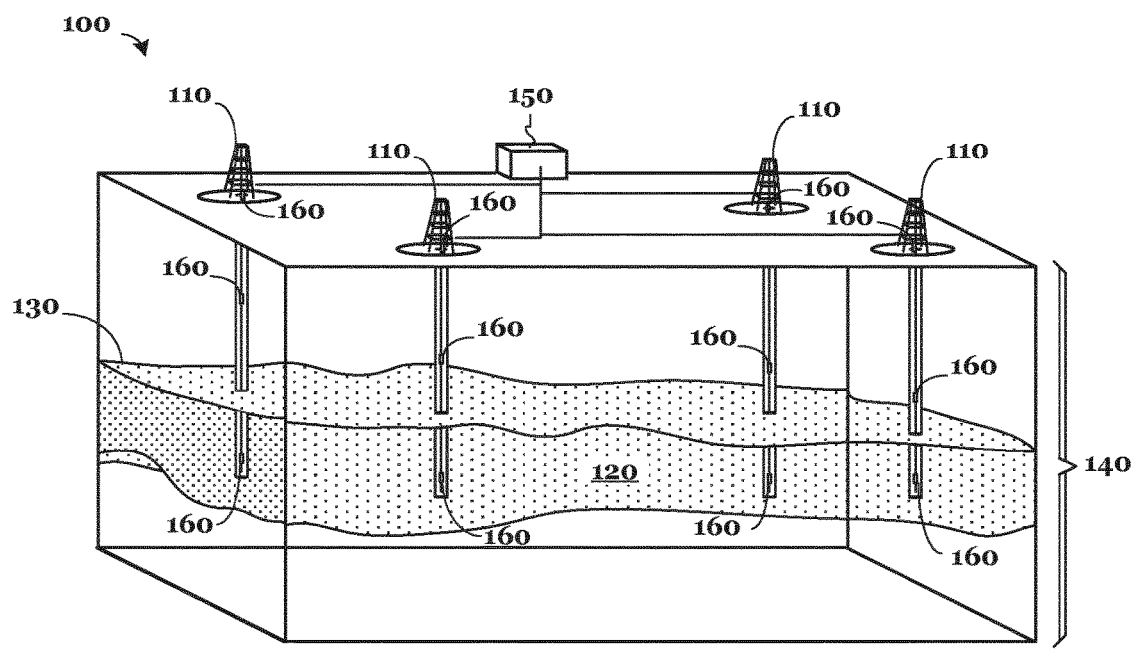
FIG. 1 depicts an exemplary field producing hydrocarbons from a deposit under the auspices of a production management system.

FIG. 1 depicts an exemplary field 100 including a plurality of wells 110 producing hydrocarbons 120 from a deposit 130 in a subterranean formation 140 under the auspices of a production management system 150. In theory, the field 100 may be any size in terms both of geographic scope and number of wells 110. However, those in the art having the benefit of this disclosure will appreciate that practical considerations typically will limit field size in both senses. The field 100 is also on land, but may in some embodiments be offshore or otherwise in a marine or transitional environment.

The drawing in FIG. 1 is furthermore highly stylized. For example, those in the art will appreciate that the formation 140 will in all probability be much more geologically complex. For another example, the wells 110 are represented as derricks, which are more commonly used in drilling than in production. These and other stylizations will be readily apparent to those skilled in the art.

The presently disclosed technique assumes that the wells 110 are already in production and so the manner in which they are drilled is immaterial. The hydrocarbons 120 may be crude oil, natural gas, or some mixture of the two. The deposit 130 may also contain other fluids that are not hydrocarbons as is well known in the art. The hydrocarbons 120 may be extracted using any technique known to the art. The manner of extraction is immaterial to the technique disclosed herein except to the extent that it may be a part of the operation of the wells 110 and whose operating parameters may be monitored and controlled using the production management system 150. Note that different extraction techniques may be employed in different wells 110 if appropriate.

Each well 110 includes a plurality of instruments 160. The instruments 160, collectively, monitor and control the operating parameters of the wells 110 and, hence, the field 100. The operating parameters will typically be those well known in the art such as choke size or pressure drop for wells, topside chokes, and riser chokes, gas lift rate for wells and risers, etc. Some of these will be controlled, some may not be.

Figure 2:
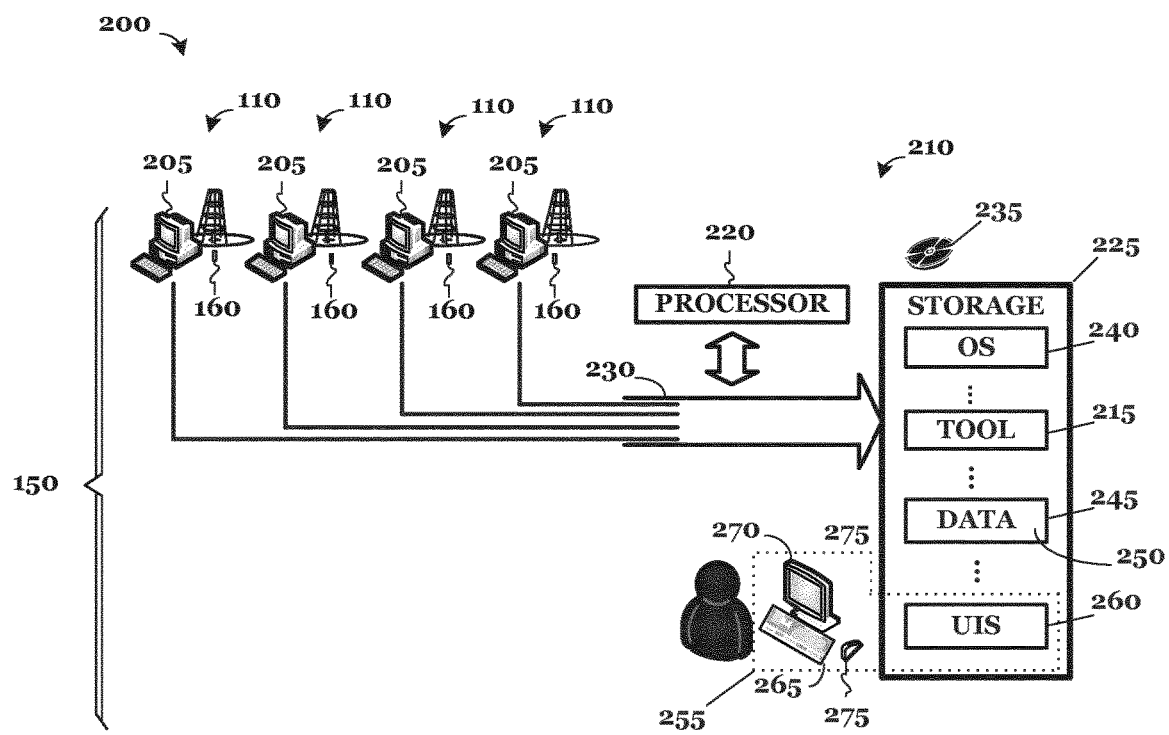
FIG. 2 conceptually depicts the production management system of FIG. 1.

The production management system 150 of FIG. 1 is conceptually illustrated in FIG. 2. The production management system 150 in this particular embodiment includes a gathering system 200 that further includes the instruments 160 distributed across the wells 110, each instrument 160 monitoring an operating parameter of a respective well 110. At least some of the instruments 160 also control the operating parameter they monitor.

The gathering system 200 also includes a plurality of computing apparatuses 205 through which the monitoring and control of the operating parameters is exercised in this particular embodiment. The computing apparatuses 205 at the wells 110 may be omitted in some embodiments such as the one discussed relative to FIG. 4-FIG. 7. These operating parameters comprise the operating state of each of the wells 110. Each well 110 has a computing apparatus 205 located at its site that monitors the operation, including the production, of that particular well 110.

The gathering system 200 furthermore includes a production computing system 210 on which resides a software tool 215. Only selected portions of the hardware and software architecture of a computing system 210 are shown. The computing system 210 may be a general purpose computing apparatus or a dedicated computing apparatus depending upon the particular implementation. The computing system 210 includes at least an electronic processor 220 communicating with storage 225 over a communication medium 230.

The electronic processor 220 may be any suitable processor or processor set known to the art. Those in the art will appreciate that data and data sets such as those used in a process such as the one disclosed herein are quite voluminous and that the processing described herein is computationally intensive. Furthermore, operations and operating points are frequently maintained in real-time or near real-time.

Implementations for the electronic processor 220 may therefore actually constitute multiple electronic processor sets spread across multiple computing apparatuses working in concert.

The storage 225 may include non-transitory storage media such as a magnetic hard disk and/or random access memory ("RAM") and/or removable storage such as an optical disk 235. The storage 225 is encoded with a number of software components including an operating system ("OS") 240; the software tool 215; a data structure 245 in which data 250 received from the instruments 160 may be stored. The storage 225 may also be distributed across multiple computing apparatuses as described above. As with the electronic processor 220, implementation-specific design constraints may influence the design of the storage 225 in any particular embodiment. For example, as noted above, the disclosed technique operates on voluminous data sets which will typically mitigate for various types of "mass" storage.

The electronic processor 220 operates under the control of the OS 240 and executes the software tool 215 over the communication medium 230. This process may be initiated automatically, for example upon startup, or upon user command. User command may be directly through a user interface 255.

The user interface 255 includes user interface software ("UIS") 260 and a display 270. It may also include peripheral input/output ("I/O") devices such as a keypad or keyboard 265 and a mouse 275. These will be implementation-specific details that are not germane to the presently disclosed technique. For example, some embodiments may forego peripheral I/O devices if the display 270 includes a touch screen. Accordingly, the presently disclosed technique admits wide variation in this aspect of the computing system 210 and any conventional implementation known to the art may be used.

Furthermore, there is no requirement that the functionality of the computing system 210 described above be implemented as disclosed. For example, the software tool 215 may be implemented as an application or in some other kind of software component, such as a daemon or utility. The functionality of the software tool 215 need not be aggregated into a single software component and may be distributed across two or more software components. Similarly, the data structures may be implemented using any suitable data structure known to the art.

As with the electronic processor 220 and the storage 225, the implementation of the communications medium 230 will vary with the particular embodiment. The production computing system 210 is typically located at some distance from the wells 110 where the computing apparatuses 205 are positioned. Accordingly, the communications medium 230 typically include wired or wireless media suitable for transmission over such distances.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or, alternatively, implemented over some type of transmission medium. The program storage medium may be magnetic (e.g., a hard drive) or optical (e.g., a compact disk read only memory, or "CD ROM"), and may be read only or random access as desired. Similarly, the transmission medium may be twisted wire pairs, coaxial cable, optical fiber, or some other suitable transmission medium known to the art. The invention is not limited by these aspects of any given implementation.

Figure 3:
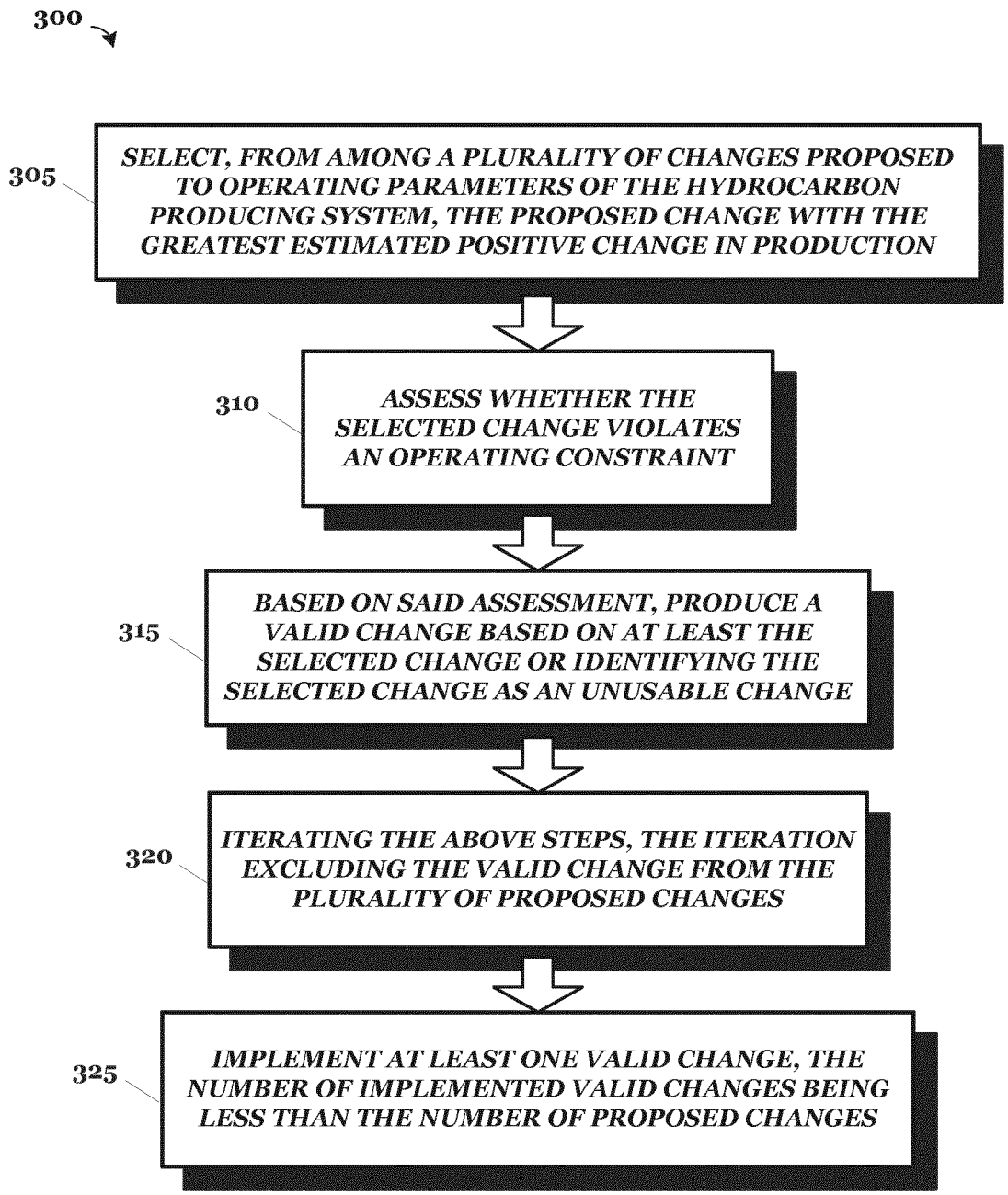
FIG. 3 illustrates one embodiment of a process for selecting, sequencing, and implementing controlled operating parameter changes in accordance with some aspects of the presently disclosed technique.

In operation, the production computing system 210 performs a process for use in managing hydrocarbon production in a field such as the process 300 of FIG. 3. The process 300 presumes that an optimized operating point has already been determined and the parameter changes for implementing the optimized operating point identified. This embodiment also presumes that the change in production that would result from each parameter change has been estimated. This is discussed more fully below in relation to the embodiment of FIG. 4 et seq.

Furthermore, not every potential change for achieving the optimized operating point is necessarily proposed for implementation. Some embodiments might employ criteria against which potential changes are measured. Potential changes meeting the criteria are presented for consideration as proposed changes while the rest are abandoned from consideration. For example, potential changes clearly violating multiple operating constraints, or producing minimal or negative changes in production might be excluded. Or the proposed changes might be limited to a certain number to facilitate the timing and handling of the process.

The process 300 begins by selecting (at 305), from among a plurality of changes proposed to operating parameters of the hydrocarbon production system 100, the proposed change with the greatest estimated positive change in production. In some embodiments, the proposed changes may be ranked from most to least in terms of estimated net change in production. In such a case, the process 300 simply selects the highest ranked proposed change. Note that it is possible that some proposed changes may have associated reductions in production rather than increases. Within the context of this disclosure an "increase" in production may be negative—i.e., a reduction—as well as positive—i.e., an actual increase.

Those in the art having the benefit of this disclosure will appreciate that both the wells 110 individually and the field 100 as a whole are subject to operating constraints for a variety of reasons. Once a proposed change has been selected (at 305), the selected change is assessed (at 310) as to whether it violates any of these operating constraints. The process 300 then, based on that assessment (at 310), produces (at 315) a valid change based on at least the selected change or identifies the selected change as an unusable change and returns it to the proposed changes for later consideration.

The assessment may be as simple as a straightforward comparison of the effects of the selected change against the operating constraints. So, for example, the hydrocarbon production system can be modeled in software as is well known in the art. The implementation of the selected change can modeled to see how it affects the operating state of the field. The newly modeled operating state can then be measured against the operating constraints to see if any of those constraints are violated. If so, the selected change may be assessed as "unusable" and, if not, the selected change is otherwise assessed as "valid".

Some embodiments may alternatively employ a more nuanced or sophisticated approach. As discussed above, sometimes the interaction between operating parameters produces effects that are not necessarily expected, or even are counterintuitive. And sometimes the effect of one change may be offset by the effects of another change. Some embodiments may therefore examine proposed operating changes other than the selected one in conjunction with the selected change before assessing whether the selected change is valid or unusable. One such embodiment is discussed below.

The process 300 then iterates (at 320) these steps (at 305-310). Each iteration excludes the valid change from the plurality of proposed changes to avoid duplication and repetition. Thus, as the iterations accumulate, the list of proposed changes eventually gets whittled down as proposed changes are assessed and excluded.

Note that various embodiments may handle the exclusion of unusable proposed changes differently. Some embodiments may exclude them as if they were valid while others may retain them as proposed changes. Some embodiments may retain them as potential offset changes for other proposed changes in embodiments which employ offset changes. However, in these embodiments the unusable proposed changes may be tracked as proposed changes that have previously been assessed, so that they are not selected again in subsequent iterations.

The number of iterations will also be implementation specific. Some embodiments may iterate until all the proposed changes have been assessed either as valid or unusable. However, operators frequently will make no more than four or five changes at a time. Thus, if there are 15-20 proposed changes, there may be no justification for iterating through all of them because no more than a handful will ever actually be implemented. Other embodiments may therefore perform only a predetermined number of iterations. In the illustrated embodiments, the offset changes are counted as changes for this purpose.

Still other embodiments may use other criteria for determining the number of iterations. For example, in the embodiment of FIG. 4 et seq., it has been discovered that 80% of the total proposed increase in production can be achieved by implementing only 20% of the proposed changes. Given the traditional operators' desire to minimize the number of changes, a criterion such as this may be used to limit the number of iterations. So, in this particular embodiment, the iterations may be limited by, for example, iterating until 20% of the proposed changes have been identified as valid, or until 80% of total proposed production increase is reached, or some combination. Combinations of all the above may also be used.

Those in the art having the benefit of this disclosure will appreciate that 20/80 measure is just a rough term for achieving a majority benefit with a small number of changes. Thus, although some embodiments might seek to reap 80% of the benefit with 20% of the proposed changes, other embodiments may achieve more than 80% benefit with 20% change. In some other embodiments, it may take more than 20% changes to achieve 80% benefit. The precision of the 20/80 goal in any given embodiment will be implementation specific.

Once the iterations (at 320) are completed, the process 300 continues by implementing (at 325) at least one valid change, the number of implemented valid changes being less than the number of proposed changes. In the illustrated embodiments, the implementation (at 325) is not performed until all the iterations (at 320) are completed. Valid changes are entered into an ordered list as they are identified and then kept there until the iterations (at 315) are completed. However, alternative implementations may perform the implementation (at 320) as each iteration (at 315) is completed.

One advantage to the process 300 is that it provides a mechanism for some embodiments to readily sequence the implementation of the valid changes. In embodiments that seek to sequence the implementation, the valid changes are assessed in the order of greatest production increase to least. The sequence can then be generated by tracking the order in which the valid changes were assessed as valid. However, not all embodiments will necessarily sequence the implementation in this manner.

The technique disclosed above lends itself to variation with the scope of the appended claims. Some such variations are mentioned above, but many are omitted for the sake of clarity and so as not to obscure the invention. To help illustrate how these and/or other variations might be realized, one particular embodiment will now be discussed. However, it is to be appreciated that not all possible variations upon the technique disclosed above are disclosed herein and that the exemplary embodiments are not limiting of the subject matter claimed below.

Hydrocarbon production systems comprise a gathering system and a production facility. The gathering system is typically configured to remove hydrocarbons from a reservoir of a geological formation, and comprises a network of flow lines and risers in fluid communication with the reservoir. The production facility is configured to process fluid output comprised of liquids and/or gases from the gathering system so as to separate oil, gas and water therefrom.

Figure 4:
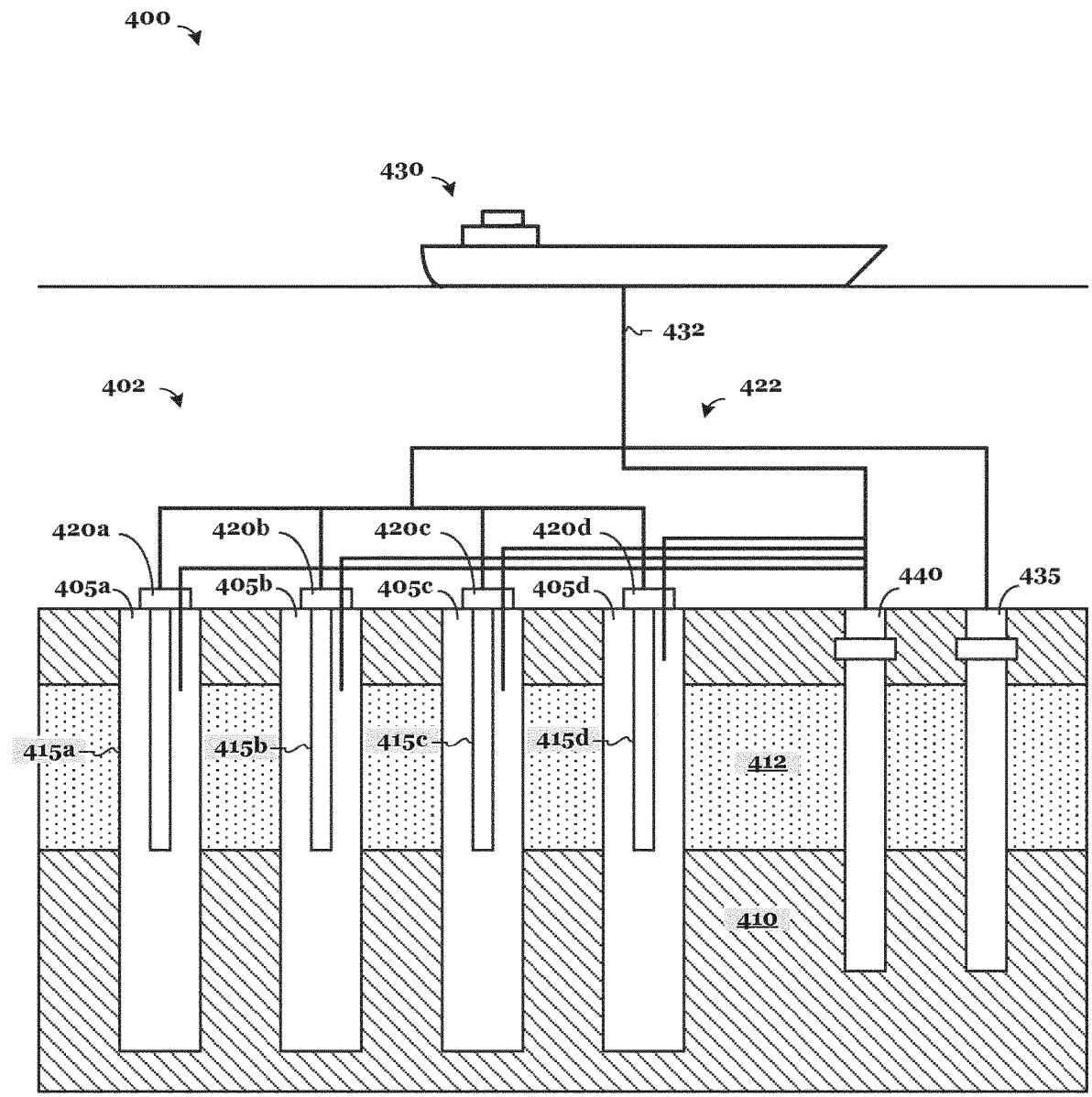
FIG. 4 is a schematic diagram showing a second exemplary hydrocarbon production system comprising a gathering system and production facility which are configured under the control of embodiments of the invention in accordance with one particular embodiment thereof.

Referring now to FIG. 4, a simplified representation of a hydrocarbon production system 400 including a typical gathering system 402 for an offshore oil field is shown as a schematic block diagram. Production wells 405a-405d drain at least one formation 410 including a hydrocarbon reservoir 412. Each production well 405a has a production tubing 415a arranged therein and is provided with a wellhead 420a that has at least one flow control component associated therewith such as a choke valve (not shown). Accordingly, the production tubing serves to transport fluids produced from the formation 410 to the wellhead 420a.

From the wellheads 420a-d, the produced fluids pass through flow lines 422 via a riser 432 to a production facility 430. The riser 432 is provided with at least one flow control component (e.g., turret valve, boarding valve) at its discharge end. The number of wells 405a-405d and risers 432 is for illustration purposes only and the number will vary by implementation. Additional components may be present. For examples, valves may be provided so that the flow path of the produced fluids can be changed Well known techniques for maintaining reservoir pressure and/or lifting produced fluids to the wellheads 420a-d may be included. The gathering system 402 may include water injection wells 435 and a gas-injection wells 440 used in the manner known to the art. However, in some embodiments, the production wells 405a-405d may operate under natural flow, gas lift, or include an electrical submersible pump (not shown) used to raise produced fluids to the wellhead 420a-d.

The production facility 430 can conveniently be located on a platform or floating production, storage and offloading installation ("FPSO"), which typically houses a variety of equipment to receive produced fluids from the separate riser(s) 432 and to separate them into a gas stream, oil stream, and/or produced water stream. The separated hydrocarbon streams can then be transported by means of hydrocarbon export pipelines (not shown) for storage, distribution, or further processing. Gas and water may be recycled for use with the water injection well 435 or the gas injection well 440 or gas lift in production wells 405a to 405d.

Figure 5:
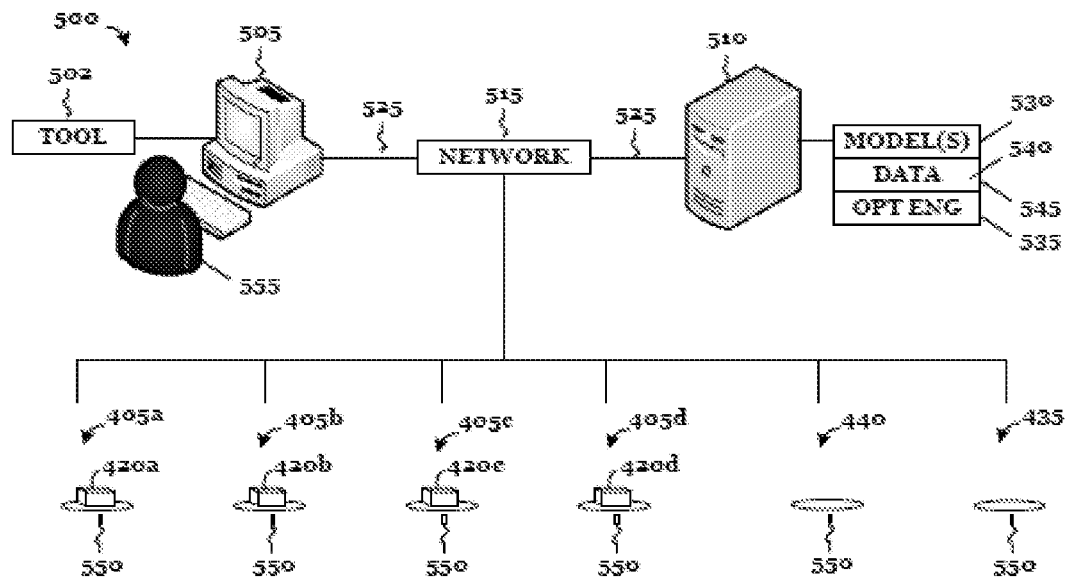
FIG. 5 is a schematic diagram showing a distributed computer system in the embodiment of FIG. 4 in which the present invention may operate.

The gathering system 402 includes a computing system 500, shown in FIG. 5. The computing system 500 includes a workstation 505, a server 510, and a network 515. The workstation 505 and server 510 are conveniently located on the production facility 430. However, they could literally be located anywhere so long as the network 515 is large enough to encompass them.

The computing system 500 also need not necessarily include the network 515. Alternative embodiments may employ, for example, a peer-to-peer architecture instead. The communications links 525 may be wired, wireless, or some combination. Those in the art having the benefit of this disclosure, however, will appreciate that wireless communications through water is difficult, at best, thereby mitigating for at least partially wired links in this particular embodiment.

In order to determine optimum settings of the various components of the hydrocarbon production system, the system is conventionally simulated by means of one or more models, each dedicated to a specific part of the hydrocarbon production system. For example, there can be a model associated with the reservoir, a model associated with the gathering system, and a model associated with the production facility.

The hydrocarbon production system 400 is modeled in accordance with conventional practice well known to the art. One available tool for this purpose is the proprietary software tool GAP™ commercially available from Petroleum Experts Ltd. A second available tool is the proprietary software tool HYSYS™ commercially available from Aspen Technology. One particular modeling technique, and one used in the illustrated embodiment, is disclosed and claimed in U.S. Ser. No. 12/737,152, filed Jun. 11, 2009, in the name of Patrick James Calvert and Richard Geoffrey Heddle ("the '152 application"). Still other tools may be available and known to the art suitable for this purpose.

The model(s) 530 are shown residing on the server 510, but this may vary in alternative embodiments. The model(s) 530 may instead reside on the workstation 505 in some embodiments, for example. This is generally true of all software components in the illustrated embodiment. The situs at which they reside is not material.

An optimization engine 535 is also shown residing on the server 510. The optimization engine 535 uses the model 530 to determine an "optimization point". The optimization point defines an operating state for the hydrocarbon production system 400 that "optimizes" the operation of the hydrocarbon production system 400. This optimization is generally in terms of production and occurs within the context of operating constraints.

Optimization engines are also well known to the art. Several are available commercially off the shelf and any such optimization engine may be used. The illustrated embodiment, however, uses the optimization engine disclosed in the '152 application. One hallmark of this optimization engine is that it presents not one, but multiple optimization points.

Those in the art having the benefit of this disclosure will appreciate that there are a number of optimization engines known to the art and suitable for use instead of the one disclosed in the '152 application. For example, one particular embodiment uses the KNITRO non-linear optimization solver that has historically been commercially available from Ziena Optimizations, Inc. Ziena was recently acquired by Artelys, from whom it is still commercially available. However, any suitable optimization engine known to the art may be used.

Figure 6:
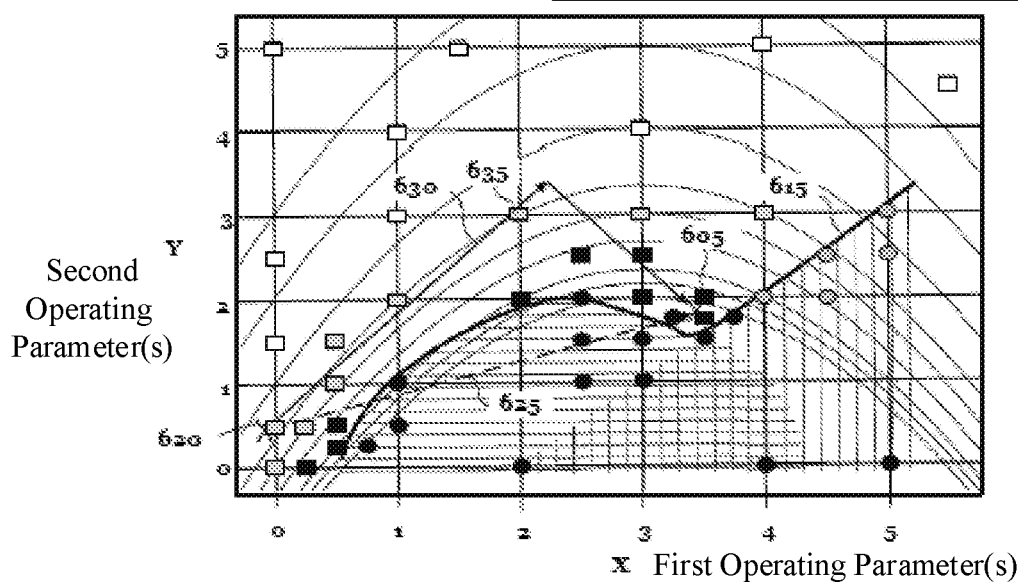
FIG. 6 is a display of optimization points obtained from the optimization engine of the computing system in FIG. 5.

More particularly, as shown in FIG. 6, operating points are obtained and collectively displayed in a single display 600 with an indication of their fitness. In this particular embodiment, fitness is most conveniently indicated by different shades on the grayscale. The points are shaded on a sliding scale such that darker points indicate operating points with the highest fitness (e.g., point 605) and lighter points indicate operating points with lower fitness values (e.g., point 620,635).

Some of the operating points are infeasible in the sense that they violate one or more applicable operating constraints of the model. Accordingly these solutions can be depicted as circles instead of squares to indicate that they are not to be considered as viable operating points. A curve 615 can be fitted around these infeasible operating points.

One particular advantage of this particular optimization engine is that operators of the hydrocarbon production system can configure the components of the hydrocarbon production system to move through a series of viable operating points and thereby avoid any operating points that violate the associated operating constraints. To illustrate this advantage, FIG. 6 shows two operating pathways from a current operating point 620 to an improved operating point 605. A first path 625 (shown in a broken line) appears to be a direct path to a good solution 615, but involves moving through the infeasible curve 615. A second path 630 comprises two parts since it involves moving via a couple of intermediate operating points 635 so as to avoid the infeasible region defined by the curve 615.

Each optimization point comprises a set of operating parameters for the hydrocarbon production system that define its state at any given time. Some of these operating parameters can be controlled, and are therefore called "controlled operating parameters". Examples include, but are not limited to, choke size or pressure drop for wells, topside chokes, and riser chokes and gas lift rate for wells and risers, for example. Those in the art having the benefit of this disclosure will recognize and readily identify still others.

The operating changes needed to move from the current operating point to an optimized operating point can be determined by a comparison of the values for the respective control operating parameters at the two points. The number of operating changes that a well operator is willing to make will depend on several factors. Such factors may include the number of control operating parameters in a given hydrocarbon production system, the degree of change involved, and stability of current operation. A typical change from a current operating point to an optimized operating point may implicate as many as 20 or 30 changes.

However, as noted above, only a handful of changes might be made. The presently disclosed technique provides the operator with a systematic, repeatable, and objective way to select the handful of potential operating changes that are actually implemented. Furthermore, in this particular embodiment the implementation of those operating changes is sequenced.

Figure 7:
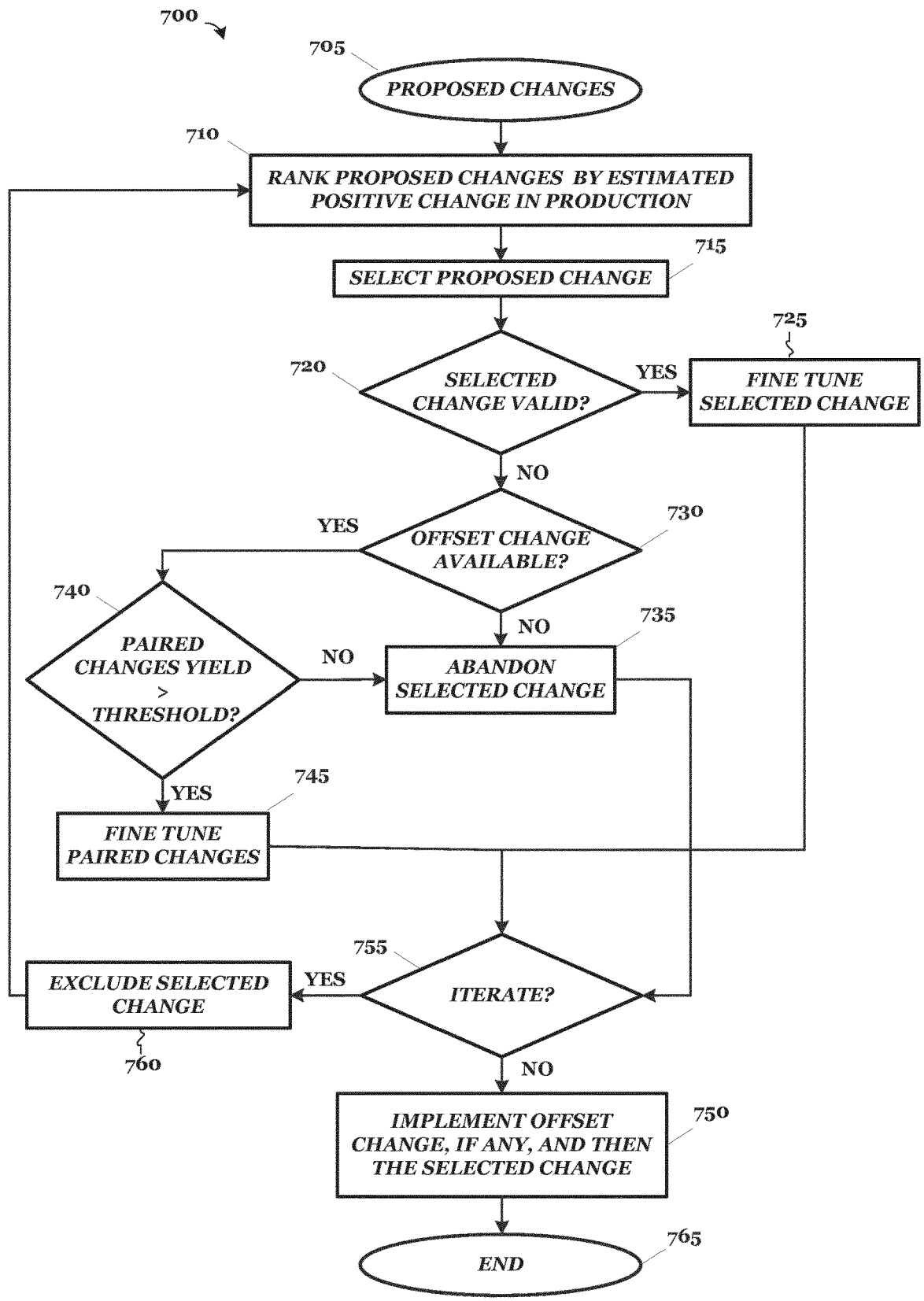
FIG. 7 illustrates a process for selecting, sequencing, and implementing controlled operating parameter changes in the embodiment of FIG. 4-FIG. 6.

Turning now to FIG. 7, the process 700 is one particular embodiment of the process 300 in FIG. 3. It is implemented by the tool 502 of the computing system 500 in FIG. 5 to manage the hydrocarbon production system 400 in FIG. 4. The tool 502 uses the model(s) 530 and optimization engine 535 operating on the data 540 to identify desirable, prospective operating points and the changes as discussed above and disclosed in the '152 application. The tool 502 furthermore implements the process 700 to maximize production while minimizing the number of changes to achieve that goal.

Returning to FIG. 7, the process 700 assumes (at 705) that the proposed changes to the operating parameters have already been identified. These may be conveniently stored in the data structure 545 on the server 510 or in some other readily available location. Some embodiments may actually include the identification of the proposed changes or even the derivation of the optimization point(s) as a part of this process.

The process 700 then ranks (at 710) the proposed changes to the operating parameters of at least one well 420 in the field 402 by the change in production estimated to result from each proposed change. The proposed changes might also be associated with equipment in the field that are not wells or directly associated with wells. This ranking is performed as follows: each proposed change is made individually to the model(s) 530 used by the optimization engine 535 and the model(s) 530 run to arrive at an estimated change in production resulting from that proposed change. The proposed changes are then ordered by their estimated change in production. This particular embodiment ranks the proposed changes from the greatest estimated positive change in production to the least. Other embodiments may rank them differently or even omit the ranking altogether.

Once the proposed changes are ranked, the process 700 then selects (at 715) the proposed change with the greatest estimated positive change in production. Given the ranking in this particular embodiment described above, the process 700 selects the top ranked proposed change, which will yield the greatest estimated positive change in production.

Each proposed change may be considered "valid" or "invalid". A "valid" proposed change is one that does not violate any operating constraints. Conversely, a proposed change is considered invalid if it violates an operating constraint. Once a proposed change is selected (at 715), the process 700 then assesses whether the selected change is valid (at 720).

If the selected change does not violate a set of operating constraints (at 715), the process 700 then adjusts (at 725) the selected change to further increase the estimated production. This "fine tuning" of the selected change may be implemented in one of several ways. For example, the selected change may be increased or decreased by a predetermined amount on the assumption that the predetermined amount will allow for an increase in production without violating an operating constraint. This process repeats until there is no further production increase or some constraint is violated. In this situation, the predetermined amount can be reduced to further fine tuning the selected change.

Alternatively, the proposed change might be adjusted by a more aggressive amount and then modeled using the model(s) 530 to see if it will result in a violation of an operating constraint. Either way, the selected change is adjusted to boost the estimated increase in production without violating an operating constraint.

The fine-tuning represented by the adjustments at various points in the process 700 is desirable because the optimization engine 535 determined the magnitude of the estimated change in production on the basis that the change was going to be made simultaneously with many other changes. Thus, the estimated change in production was balanced with those of all the other changes. The process 700, however, results in a selection of only a few of the proposed changes and so this balance is not necessary in actual implementation. This provides more freedom to truly optimize each individual selected change.

Furthermore, the optimization engine 535 in this particular embodiment is typically yields a local minimum. The more control parameters there are, the more local minimums there are. This provides an opportunity to further improve the solution using the "fine adjustment" described above. More particularly, the estimated change in production as a function of the control variables will produce a plurality of local minima and maxima. The fine tuning is essentially the process of finding a local maximum in the estimated production from the point obtained by the optimization.

If the selected change violates an operating constraint (at 720), some embodiments may abandon the selected change. "Abandoned" in this context means that the selected change is removed from consideration and returned to the list of proposed changes for later consideration. However, instead of abandonment at this point, this particular embodiment instead searches (at 730) for an "offset change".

The tool will first find which constraint is violated the most and search the remaining proposed change which can offset this violation. An offset change is one of the remaining proposed changes that, when performed before the selected change, will offset the selected change to obviate violating the operating constraints. It may be that there is no offset change available. If so, then the selected change is abandoned (at 735) and returned to the list of proposed changes for later consideration.

However, if there is an offset change (at 730), the process 700 pairs, or "groups", the selected change with the offset change for subsequent handling. Some embodiments may then designate the paired selected change and offset change for implementation; this combination of the offset change and the selected change together become the valid change. Because one goal in this particular embodiment is to maximize estimated production increase with minimal changes, the combined estimated change in production of the paired selected and offset changes is examined. More particularly, the combined estimated production increase is subjected to a determination (at 740) to see if, between the two proposed changes, there is enough increase to justify implementing both at the sametime.

The determination in this particular embodiment is whether the estimated production of the grouped changes meets or exceeds the estimated production of the second greatest estimated production by a first threshold amount without violating the operating constraints. In one implementation, the threshold amount is x2. That is, the process 700 determines whether the combined estimated production increase of the selected and offset changes is at least twice the combined production increase of the next highest ranked valid proposed change.

If the paired selected and offset changes do not meet the threshold and fail the determination (at 740), the selected change is then abandoned (at 735) and returned to the list of proposed changes for later consideration. Conversely, if they pass the determination (at 740), then they are fine-tuned to further increase their combined estimated production increase. Either one of the selected change and the offset change, or both, may be adjusted. In the illustrated embodiment they are adjusted separately and sequentially. The manner in which the adjustment is made may be the same or different than that manner in which adjustments are made (at 725) to valid selected changes to fine tune them. As with the fine-tuning of valid selected changes (at 725), this fine-tuning (at 745) may be omitted in some embodiments.

Once a selected change has been identified as valid (at 720, 740), either singly or paired with an offset change, and any fine-tuning has been applied (at 725, 745), to the selected change and the grouped offset change, the process 700 then decides (at 755) whether to iterate these steps on another proposed change. The criteria for the number of iterations will be implementation specific. Some embodiments may specify a certain number (e.g., 5) of changes to implemented, and iterate until that number of changes have been identified and implemented. (These embodiments may include both offset changes and selected changes in this count.) Or, taking a cue from the 20/80 approach, the process 700 might iterate until 20% of the proposed changes are implemented or 80% of the estimated production is achieved. Or, some embodiments might choose to iterate through all the proposed changes until some degree of convergence is experienced.

In this particular embodiment, the iteration continues until the increase in estimated production associated with the unselected proposed changes that are not offset changes falls below a second threshold amount prior to selecting all the proposed changes. The second threshold, like the iteration criterion itself, may vary by implementation. In the illustrated embodiment, that second threshold is 0.5 stb/d.

If the decision (at 755) is to iterate, the selected change is excluded from the list of proposed changes and the process 700 begins by once again ranking (at 710) the proposed changes by their estimated positive change in production. In this second iteration of the ranking process, when the model is run for each remaining change on the list of proposed changes, it uses the selected change arrived at in the first iteration. Accordingly, the outcome of the model can change from one iteration to another.

This can be of consequence in situations where a proposed change is unusable (e.g. because an offset change cannot be identified or because paired changes would not result in a production increase exceeding the threshold). As mentioned above, in situations where a proposed change is found to be unusable, it can be returned to the ranked list of proposed changes. The process then selects the proposed change with the next greatest estimated increase in production (note that the unusable proposed change would have the first greatest estimated increase). The next proposed change is assessed as to whether it is valid (at 720) and the process continues to fine-tuning.

Assuming that the next proposed change is valid and fine-tuned, the process moves to a new iteration. In the ranking process for this new iteration, the model is different and so the outcome of the model is different. As a consequence, a proposed change which was invalid in a previous iteration may become valid in subsequent iterations, or an offset change may be found where one was not previously available.

Note that the number of proposed changes steadily decreases as previously selected changes are excluded (at 760). (Offset changes, if any, are also excluded when their associated selected change is excluded as a previous valid change.)

If the decision (at 755) is not to iterate, then the process 700 proceeds to implement (at 750) the valid changes. Where a valid change comprises a selected change and an offset change, the offset change is implemented before the selected change. Once all valid changes have been implemented, the process 700 ends (at 765).

Note that the process 700 inherently yields not only valid operating parameter changes to be made but also a sequence in which they should be implemented. This is beneficial as described above for at least a couple of reasons. First, it permits those changes that will yield the greatest estimated positive change in production to be identified and implemented first, so that a significant proportion of potential production increase can be achieved by implementing only a few changes. Second, it assures that every change in the sequence will satisfy all constraints.

Those in the art having the benefit of this disclosure will appreciate that the implementation of the valid operating parameter changes, including any offset operating parameter changes, will depend on the nature of the parameter change. Returning to FIG. 5, each proposed parameter change is associated with one or more controlled actuators 550 in the wells 405, 435, 440. Once the operator 555 has reviewed the sequenced operating parameter changes and concurs in their selection, they can use the tool 502 to implement those changes. Appropriate instructions are then forwarded through the network 515 to the implicated actuators 550.

The presently disclosed technique can, in at least this particular embodiment, substantially reduce the number of control operating parameters to change while substantially increasing the total production rate. Also, every change in the change sequence will satisfy the applicable constraints. With this substantial increase in production and concomitant number of changes decrease, this technique helps assets maximize their production rate with the minimum number of changes, which will reduce the potential adverse operational consequences introduced by too many changes.

More particularly, based on the optimization results, the change sequence for control operating parameters and associated benefits can be generated. In this sequence, the change(s) (either singly or a paired) with the largest rate increase was listed at the top of the change sequence, and followed by the change with less rate increase. This change sequence and associated benefit inform the engineers what to change, how to change, and what benefit they should expect from these changes. One particular benefit of this particular embodiment is that it provides a 20/80 solution which generates the most benefit with minimum number of control variable changes.

The presently disclosed technique admits variation on the embodiments described above within the scope of the appended claims. For example, the process 700 in FIG. 7 ranks the proposed changes with each iteration, but alternative embodiments may not rank in each iteration. Such embodiments would continue to work from the original ranking. Similarly, each valid change may be implemented during the iteration whereas the illustrated embodiments save the changes and implement them after all the iterations are completed. Furthermore, the illustrated embodiments group only a single offset change with an invalid selected change, hence the use of the term "paired". However, alternative embodiments may group two or more offset changes. Still other variations may be realized.

The above disclosure occasionally refers to goals or objectives of various embodiments. However, not all embodiments will necessarily manifest all the goals and objectives set forth herein although some may. Furthermore, to the extent that any given embodiment might manifest one or more of those goals or objectives, they do not necessarily do so to the same degree as other embodiments that might also. The goals and objectives set forth above pertain to particular embodiments disclosed herein and are not necessarily to be considered limiting of the appended claims.

U.S. Ser. No. 12/737,152, filed Jun. 11, 2009, in the name of Patrick James Calvert and Richard Geoffrey Heddle, and entitled "Method and Apparatus for Configuring Hydrocarbon Production System" ("the '152 application") is hereby incorporated by reference for all purposes as if expressly set forth verbatim herein. To the extent any disclosure in the '152 application conflicts with the disclosure herein, the disclosure herein controls. The '152 application is commonly assigned herewith.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A process for use in managing a hydrocarbon producing system implemented by a computing system, comprising:
   selecting, from among a plurality of changes proposed to operating parameters of the hydrocarbon producing system, a change with the greatest estimated positive change in production from the plurality of changes proposed;
   assessing whether the selected change violates a set of operating constraints;
   producing a valid change based on at least the selected change in response to the assessment,
   iterating the above steps, the iteration excluding the valid change from the plurality of proposed changes; and
   implementing at least one valid change, the number of implemented valid changes being less than the number of proposed changes.

2. The process of claim 1, wherein implementing at least one valid change occurs after iterating the above steps.

3. The process of claim 1 or claim 2, wherein iterating the above steps includes iterating the above steps until all proposed changes have been selected.

4. The process of claim 1 or claim 2, wherein iterating the above steps includes iterating the above steps a predetermined number of times.

5. The process of any one of the preceding claims, wherein implementing valid change based on at least the selected change includes:
   identifying the selected change as the valid change in response to the selected change not violating the set of operating constraints; and
   determining whether any of the remaining proposed changes, when performed before the selected change, will offset the selected change to obviate violating the operating constraints in response to the selected change violating the operating constraints; and
   grouping the offset change with the selected change such that the offset change is implemented before the selected change.

6. The process of claim 5, further comprising identifying the selected change as an unusable change by abandoning the selected change if an estimated change in production of the grouped offset change and the selected change fails to exceed the estimated change in production of the proposed change with the second greatest estimated positive change in production by a first threshold amount.

7. The process of claim 5 or 6, further comprising identifying the selected change as an unusable change by abandoning the selected change if the selected change violates the operating constraints and if none of the remaining proposed changes, when performed before the selected change, will offset the selected change to obviate violating the operating constraints.

8. The process of any one of the preceding claims, further comprising adjusting the valid change to further increase the estimated change in production associated with the valid change.

9. The process of claim 8 when dependent on claim 5, wherein, if the valid change is identified as the selected change, adjusting the valid change comprises adjusting the selected change, and if the valid change is identified as the grouped offset change and selected change, adjusting the valid change comprises adjusting the grouped offset change and the selected change.

10. The process of claim 8 or claim 9, wherein adjusting the valid change to further increase the estimated change in production includes adjusting the valid change to maximize the increase within the set of operating constraints.

11. The process of any one of the preceding claims, wherein the valid changes are sequenced in the order in which they are assessed; and wherein the valid changes are implemented in the order in which they are sequenced.

12. The process of any one of the preceding claims, wherein selecting the proposed change with the greatest estimated positive change in production includes ranking the proposed changes according to their respective estimated changes in production.

13. The process of claim 12, wherein ranking the proposed changes includes:

identifying the proposed changes to bring a hydrocarbon producing system from a current operating state to an optimized operating state;

sequentially modeling each of the proposed changes to estimate the production change for each of the proposed changes; and ranking the proposed changes in descending order of the greatest estimated increase in production from the hydrocarbon producing system.

14. The process of claim 13, wherein identifying the proposed changes includes:

executing an optimization engine to determine the optimized operating state; and identifying the proposed changes from the differences in the operating parameters of the current operating state and the optimized operating state.

15. The process of claim 1, further comprising:

executing an optimization engine to determine an optimized operating state for the hydrocarbon production system; and identifying the proposed changes from the differences in the operating parameters of the current operating state and the optimized operating state.

16. The process of any one of the preceding claims, further wherein iterating the steps includes terminating the process if the change in estimated production becomes less than a second threshold amount prior to selecting all the proposed changes.

17. A process for use in managing hydrocarbon production in a field implemented by a computing system, comprising:

ranking a plurality of changes proposed to operating parameters of at least one well in the field by an estimated change in production from each proposed change;

selecting the proposed change with the greatest estimated positive change in production;

if the selected change does not violate a set of operating constraints, adjusting the selected change to further increase the estimated production;

if the selected change violates the operating constraints, then:

determining whether any of the remaining proposed changes, when performed before the selected change, will offset the selected change to obviate violating the operating constraints;

grouping the offset change with the selected change;

if the estimated production of the grouped changes meets or exceeds the estimated production of the proposed change with the second greatest estimated production by a first threshold amount without violating the operating constraints, then adjusting the grouped changes to further increase the estimated production; and abandoning the selected change if the estimated production of the grouped selected change and offset change fails to exceed the estimated production of the proposed change with the second greatest estimated production by a first threshold amount;

iterating the above steps until either the increase in estimated production falls below a second threshold amount or all changes have been selected; and implementing the selected changes if they have not been abandoned and any respective grouped offset changes, if any, the selected change being implemented after any grouped offset change.

18. The process of claim 17, wherein ranking the proposed changes includes:

identifying the proposed changes to bring a hydrocarbon production system for the field from a current operating state to an optimized operating state;

sequentially modeling the proposed changes to estimate production increases for each proposed change; and ranking the proposed changes in descending order of the greatest estimated increase in production from the field.

19. The process of claim 18, wherein identifying the proposed changes includes:

executing an optimization engine to determine the optimized operating state; and identifying the proposed changes from the differences in operating parameters between the current operating state and the optimized operating state.

20. A production management system for managing a hydrocarbon producing system, the production management system comprising:

a plurality of instruments distributed across the hydrocarbon producing system, each instrument monitoring an operating parameter of the hydrocarbon producing system and at least some of the instruments also controlling the respective monitored operating parameter;

a computing apparatus; and a software tool residing on the computing apparatus that, when executed by the computing apparatus, performs a method comprising:

selecting, from among a plurality of changes proposed to operating parameters of the hydrocarbon producing system, a change with the greatest estimated positive change in production from the plurality of changes proposed;

assessing whether the selected change violates a set of operating constraints;

producing a valid change based on at least the selected change in response to the assessment, iterating the above steps, the iteration excluding the valid change from the plurality of proposed changes; and implementing at least one valid change, the number of implemented valid changes being less than the number of proposed changes.

* * * * *